3,125,607
PURIFICATION OF VINYL CHLORIDE
Harry M. Keating and Phillip D. Montgomery, Texas City, Tex., assignors to Monsanto Chemical Company, St. Louis, Mo., a corporation of Delaware
No Drawing. Filed Dec. 22, 1960, Ser. No. 77,514
3 Claims. (Cl. 260—656)

This invention relates to the purification of vinyl chloride and, more particularly, to the purification of vinyl chloride containing butadiene as an impurity.

As is well known, vinyl chloride, a monomer of considerable commercial importance is produced by the addition reaction of acetylene and hydrogen chloride in the presence of suitable catalysts. The acetylene employed if derived from hydrocarbons usually contains minor quantities of contaminants among which is butadiene. This diolefin impurity is carried through the system and the vinyl chloride product recovered from such processes thus contains minor amounts of butadiene, i.e., amounts up to about 200 parts per million, because butadiene is not separable from vinyl chloride by the usual distillation techniques used for purifying the monomer. While at first glance such quantities appear so small as to be unimportant, it has been determined that only traces of butadiene, i.e., 5 p.p.m. or less, act to inhibit the polymerization rate of vinyl chloride significantly and because of this effect the deine cannot be tolerated in the monomer.

Accordingly, it is an object of the present invention to provide a simple, commercially feasible method for purifying vinyl chloride to obtain a product essentially free from butadiene and thus eminently suitable for conversion at efficient rates to high-quality polyvinyl chloride. This and other objects and advantages of the invention which will become apparent from the following description thereof are attained by subjecting the vinyl chloride containing butadiene to chlorination under conditions such that the butadiene is chlorinated while the vinyl chloride remains substantially unchanged. The vinyl chloride can then be readily isolated or recovered.

According to the preferred embodiment of the invention, chlorine is introduced into liquid vinyl chloride containing butadiene maintained at a temperature in the range from −30° C. to 20° C. under conditions of efficient agitation, the liquid product is withdrawn and vinyl chloride substantially free from butadiene is recovered by conventional fractionation techniques.

The following examples will serve to illustrate the principle of the invention but are not to be construed as limiting its scope in any manner whatsoever.

*Example 1*

To 1000 g. of liquid vinyl chloride in a Dewar flask at −30° C. there was added 0.27 ml. of butadiene. A small sample was withdrawn and analyzed by a gas chromatographic method for butadiene content which was found to be approximately 200 parts per million parts of vinyl chloride (p.p.m.). About 0.17 ml. of chlorine was injected into this mixture below the liquid level by means of a hypodermic syringe and the resulting mixture was stirred vigorously. The flask was then covered with black paper leaving only an opening for the thermometer inserted into the flask. Samples were withdrawn at intervals and analyzed for butadiene on the gas chromatograph. After about 1.4 hours, the butadiene content of the mixture was only 82 p.p.m. and at the end of another 75 minutes it had been further reduced to about 75 p.p.m. During the period of treatment the flask had warmed up only a few degrees to about −25° C.

*Example 2*

The procedure of Example 1 was repeated at −20° C. except that a small amount of anhydrous ferric chloride was added to the vinyl chloride-butadiene mixture to remove ice flakes and water collected in transferring the vinyl chloride to the flask. Analysis of the vinyl chloride-butadiene-ferric chloride mixture before chlorine was injected established that it contained approximately 200 p.p.m. of butadiene. After this mixture had been allowed to stand for one hour and 20 minutes, it was again analyzed for butadiene content to determine whether the ferric chloride in any way affected the butadiene content of the mixture. No effect was apparent since the analysis indicated a butadiene content of 195 p.p.m. After the addition of 0.54 ml. of chlorine (ratio of chlorine to butadiene of 2:1) to the mixture, the butadiene content of the mixture obtained by gas chromatographic analysis of samples withdrawn at the indicated time intervals was as follows:

| Minutes | P.p.m. butadiene |
|---|---|
| 0 | 200 |
| 40 | 130 |
| 75 | 55 |
| 150 | 40 |
| 200 | 20 |

A plot of these data extrapolated to 0 p.p.m. butadiene indicates that the butadiene could be completely removed in about 240 minutes.

*Example 3*

The experiment of Example 2 was repeated using higher mole ratios of chlorine to butadiene. Results obtained were as follows:

| Chlorine:Butadiene (Mole Ratio) | Butadiene Content (p.p.m.) | Elapsed Time (min.) |
|---|---|---|
| 0 | 200 | 0 |
| 4:1 | 0 | 40 |
| 5:1 | 0 | 35 |

It is obvious that various modes of applying the principle of the invention can be employed. The reaction can be carried out, for example, in conventional equipment ordinarily utilized for liquid-liquid or vapor-liquid reactions. In the latter case, for example, a countercurrent, bubble cap, absorption column or packed tower can be used. In this case where operation would be continuous, the chlorine gas would be introduced at the bottom of the column and be bubbled upward through the descending liquid vinyl chloride containing butadiene. In batch operations, any suitable kettle-type reactor provided with efficient agitating means and an inlet distributor at the bottom for injecting chlorine either in the liquid or vapor phase as desired into liquid vinyl chloride can be employed.

While the purification is preferably effected at a temperature from about −20° C. to about 0° C., any temperature in the range from −30° C. to about 20° C. can be used. Likewise, while the preferred pressure is atmospheric, the use of superatmospheric or subatmospheric pressures is not precluded.

For the most efficient removal of butadiene by the method of the invention, the system should be kept anhydrous. Dehydrating agents other than the ferric chloride exemplified can, of course, be used to eliminate all traces of moisture. Suitable materials include, for example, calcium sulfate, calcium chloride and the like.

Also, good agitation is necessary to provide optimum contact between the monomer being treated and the chlorine contacting agent.

The quantity of chlorine employed and the time allowed for the reaction to go to completion may vary over wide limits. The minimum quantity of chlorine required is the stoichiometric quantity necessary to react with all the butadiene present. However, reaction time and other impurities present are also factors to be considered. Mole ratios of chlorine to butadiene of 1:1 to 5:1 are generally satisfactory with the time of treatment varying depending upon the chlorine-to-butadiene ratio employed, the temperature, and the degree of purification desired. Longer reaction times are required for complete removal at the lower mole ratios ranging from about 4 hours at the 1:1 ratio to about 0.5 hour at a ratio of 3:1 and up for complete removal of butadiene. Preferably, a ratio of chlorine-to-butadiene of 3:1 to 5:1 is used with a reaction time of about 0.5 hour. The higher ratios of chlorine to butadiene are required, too, when other impurities which might react with chlorine are present since in these cases more chlorine is necessary to effect complete removal of butadiene.

Subsequent to the chlorination treatment, vinyl chloride substantially free of butadiene can be readily recovered by a conventional fractional distillation by which it is separated from the chlorination product of butadiene and chlorine and any other impurities present.

What is claimed is:

1. A process for the purification of vinyl chloride containing minor amounts of butadiene which comprises intimately contacting said vinyl chloride in the liquid phase with chlorine at a temperature within the range from about —20° C. to about 0° C., the amount of chlorine being such that the mole ratio of chlorine to butadiene contained in said vinyl chloride is from about 1:1 to about 5:1, and recovering said vinyl chloride.

2. The process of claim 1 wherein said contacting is effected over a period of time up to about 4 hours.

3. A process for the purification of vinyl chloride containing minor amounts of butadiene which comprises intimately contacting said vinyl chloride in the liquid phase with chlorine at a temperature in the range from about —20° C. to about 0° C., the amount of chlorine being such that the mole ratio of chlorine to butadiene in said vinyl chloride is from about 3:1 to about 5:1 and said contacting is effected over a period of about 30 minutes and recovering said vinyl chloride.

References Cited in the file of this patent
UNITED STATES PATENTS

| 2,446,123 | Boyd | July 27, 1948 |
| 2,616,883 | Marous | Nov. 4, 1952 |

OTHER REFERENCES

Serial No. 287,249, Schmidt (A.P.C.), published Apr. 20, 1943.

Huntress: Organic Chlorine Compounds, page 663, John Wiley & Sons, Inc., New York, New York (1948).